C. D. FILKINS.
CLAMP, BINDING POST, OR THE LIKE.
APPLICATION FILED AUG. 24, 1918.

1,297,133.

Patented Mar. 11, 1919.

Inventor:
Charles D. Filkins,
by *Albert G. Davis*
His Attorney.

UNITED STATES PATENT OFFICE.

CHARLES D. FILKINS, OF SCHENECTADY, NEW YORK, ASSIGNOR TO GENERAL ELECTRIC COMPANY, A CORPORATION OF NEW YORK.

CLAMP, BINDING-POST, OR THE LIKE.

1,297,133. Specification of Letters Patent. Patented Mar. 11, 1919.

Application filed August 24, 1918. Serial No. 251,236.

*To all whom it may concern:*

Be it known that I, CHARLES D. FILKINS, a citizen of the United States, residing at Schenectady, in the county of Schenectady, State of New York, have invented certain new and useful Improvements in Clamps, Binding-Posts, or the like, of which the following is a specification.

My invention relates to a clamping support or binding-post of novel construction for rigidly supporting wires, metallic ribbon, or the like.

The object of my invention is to provide simple, cheap and efficient supporting posts for the spiral windings of oscillation transformers commonly used in radio systems; it is not, however, limited in its application to a supporting means for electric conductors, but is of general utility as a mechanical expedient for clamping wires, rods, sheet material, etc.

In the practice of the invention I make use of the wedging action of two tapered members and to this end employ a bolt or stud provided with a tapered head corresponding to one-half of the conical head of an ordinary wood-screw, and a cylindrical post having a bore of proper size to receive the stud; one end of the bore being tapered to receive the half-head of the stud. A kerf or slot is cut diametrically through the end of the cylindrical post to the depth of the tapered portion of the bore and receives the sheet metal, wire, or other material to be supported, which may be clamped between one side of the kerf and the flat side of the half-head of the bolt by moving the bolt into fixed position in the post, for instance, by tightening a nut on the opposite end of the bolt.

Figure 1:
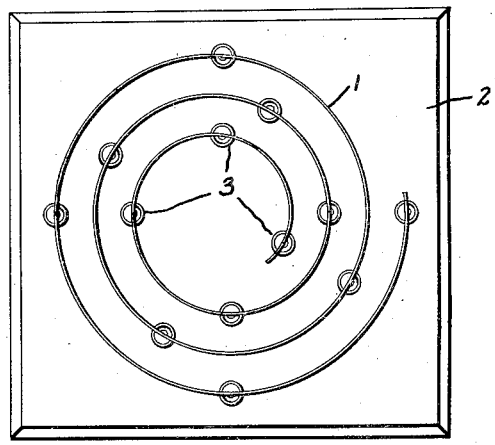
Figure 4:
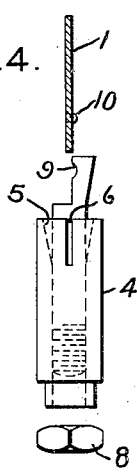
Figure 3:
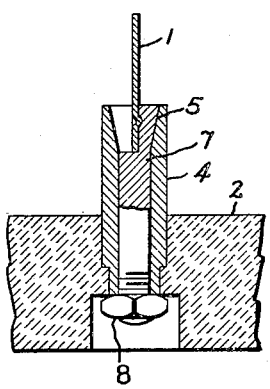
Figure 2:
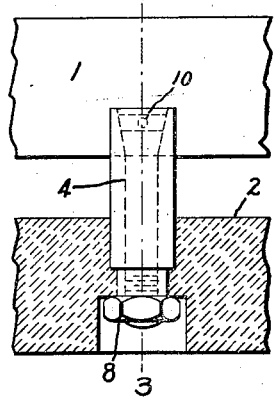

The arrangement of the various elements of the invention will be more fully explained in the following description in connection with the accompanying drawing in which Figure 1 shows part of an oscillation transformer, such as is used in wireless telegraph systems, and which illustrates one application of my invention; Fig. 2 is an elevational view of one of the supporting posts; Fig. 3 is a sectional view taken on line 3—3 of Fig. 2, and Fig. 4 is a view showing in detail the various parts.

Referring to Fig. 1 of the drawing, which shows enough of an oscillation transformer for my purpose, 1 is a spiral winding formed of a strip of sheet metal supported on the base 2, of slate or other suitable insulating material, by the clamping posts 3. The clamping posts 3 comprise a hollow cylindrical member 4 fitting snugly in a hole in the base 2, one end of the bore of the post 4 being tapered at 5, a kerf 6 being cut diametrically through the end of the post to the depth of the tapered portion of the bore.

A bolt or stud 7, fitting the bore of the post, is provided with a tapered head corresponding, as previously stated, to half of the conical head of a common wood-screw, the half-head being of such thickness that the flat side coincides normally with the nearer side of the kerf 6 in the post 4.

The opposite end of the bolt or stud 7 is threaded to receive a nut 8 which serves to draw the tapered head firmly against the correspondingly tapered end of the bore of post 4 and clamp the conductor or other material to be supported between the flat face of the head of the stud and the opposing edges of the kerf in the member 3, and at the same time to securely fasten the post to the base by clamping a shoulder on the post against a corresponding shoulder on the base.

The flat side of the half-head of the stud 7 preferably is provided with a transverse groove 9 to receive a projection 10 on the strip 1 to be supported. The projections 10 on the strip 1 may be formed by expanding the metal with a prick-punch applied to the other side of the metal.

While I have described my invention as adapted for supporting ribbon like material, it will be understood that the device may be arranged for supporting wire or bar material of any cross section; and the groove in the flat face of the stud head may be shaped to fit a curved or angular surface.

Other modifications will readily suggest themselves, and while I have shown and described my invention in a preferred form for a particular application thereof, in accordance with the requirements of the patent statutes, I aim in the appended claims to cover all such modifications as lie within the scope of my invention.

What I claim as new and desire to secure by Letters Patent of the United States, is:—

1. A binding post comprising in combination, a hollow post, a stud slidable therein, said post and stud having coöperating tapered surfaces and mutually opposed clamping surfaces adapted to receive between them a member to be clamped, and means for moving the stud into fixed position in said post to force said mutually opposed surfaces into clamping position.

2. A binding post comprising in combination, a hollow post provided with a kerf in one end thereof, a stud slidable therein provided with a half-head having a flat face, said kerf and said flat face adapted to receive and engage a member to be clamped, said post and stud head having coöperating tapered surfaces, and means for moving the stud into fixed position in said post.

3. A binding post comprising in combination, a hollow post provided with a kerf in one end thereof, a stud slidable therein provided with a half-head having a flat face, said kerf and said flat face adapted to receive and engage a member to be clamped, the flat face of said stud head provided with a groove adapted to receive a projection on the member to be clamped, the post and stud head provided also with coöperating tapered surfaces, and means for moving the stud into fixed position in said post.

4. The combination with a member to be supported, of a supporting device therefor comprising a hollow post provided with a kerf in one end thereof, a stud slidable therein and provided with a half-head having an axial flat face and a transverse groove therein, said member to be supported received in the kerf in said post and engaged by the axial flat face of the stud head, a projection on said member engaging said groove, said post and stud head having coöperating tapered surfaces, and means for moving said stud into fixed position in said post to clamp said member.

5. The combination with a base and a member to be supported thereon, of a plurality of supporting devices each of which comprise a hollow post, a stud slidable therein, said post and stud having coöperating tapered surfaces, said member to be supported being mounted between portions of said post and stud, and means for moving the stud into fixed position in said post to clamp said member and simultaneously clamp said post to said base.

In witness whereof, I have hereunto set my hand this 22nd day of August 1918.

CHARLES D. FILKINS.